United States Patent [19]

Graham

[11] Patent Number: 4,988,980

[45] Date of Patent: Jan. 29, 1991

[54] LOW COST VERBAL ANNUNCIATOR

[75] Inventor: Randall C. Graham, Nashville, Tenn. 37206

[73] Assignee: Essex Group, Inc., Fort Wayne, Ind.

[21] Appl. No.: 788,990

[22] Filed: Oct. 18, 1985

[51] Int. Cl.[5] .......... G08B 25/08; G11B 5/00; H01H 47/00

[52] U.S. Cl. .......... 340/692; 340/521; 340/679; 360/12; 361/170

[58] Field of Search .......... 340/692, 677, 624, 679, 340/521, 517, 52 F; 360/12, 69; 361/170; 200/61.13–61.18; 19/0.23; 242/75.52; 28/187; 184/108; 369/1, 20, 53

[56] References Cited

U.S. PATENT DOCUMENTS

| | | | |
|---|---|---|---|
| 2,586,960 | 2/1952 | Kivley et al. | 200/61.13 X |
| 2,685,626 | 8/1954 | Zwack | 200/61.18 X |
| 2,950,520 | 8/1960 | Sonnino | 19/0.23 X |
| 3,059,309 | 10/1962 | Blanton | 28/187 |
| 3,204,230 | 8/1965 | Hosford, Jr. | 340/624 X |
| 3,251,049 | 5/1966 | Hallerberg | 340/503 |
| 3,264,613 | 8/1966 | Stolle | 340/825.5 |
| 3,298,010 | 1/1967 | Dubosq et al. | 340/692 X |
| 3,310,793 | 3/1967 | Takarabe et al. | 340/692 X |
| 3,375,491 | 3/1968 | Hornung et al. | 360/12 X |
| 3,457,559 | 7/1969 | Hubbard | 340/502 |
| 3,537,094 | 10/1970 | Hawkins et al. | 340/521 |
| 3,582,949 | 6/1971 | Forst | 340/692 X |
| 3,603,707 | 4/1971 | Stantz | 431/16 |
| 3,714,646 | 1/1973 | Nurnberg et al. | 340/517 |
| 3,729,734 | 4/1973 | Kipling | 340/506 |
| 3,731,890 | 5/1973 | Ruoff et al. | 242/75.52 X |
| 3,798,672 | 3/1974 | Gregg, Jr. | 360/12 |
| 3,842,668 | 10/1974 | Lippke | 200/61.13 X |
| 3,845,323 | 10/1974 | Bellasio | 307/120 |
| 3,870,818 | 3/1975 | Barton et al. | 340/692 X |
| 3,909,842 | 9/1975 | Noji | 360/12 X |
| 3,922,716 | 11/1975 | Arnold | 360/12 |
| 3,958,663 | 5/1976 | Moore | 184/108 X |
| 3,965,317 | 6/1976 | Gratzmuller | 340/624 X |
| 3,974,338 | 8/1976 | Luzier et al. | 360/12 X |
| 3,999,175 | 12/1976 | Thibodeau | 340/644 |
| 4,024,521 | 5/1977 | Salk | 340/635 X |
| 4,223,302 | 9/1980 | Hocking | 340/525 |
| 4,439,635 | 3/1984 | Theis et al. | 360/12 X |
| 4,481,507 | 11/1984 | Takiguchi et al. | 340/692 X |
| 4,557,435 | 12/1985 | Reishus | 242/75.52 X |
| 4,635,046 | 1/1987 | Graham | 340/677 |
| 4,644,332 | 2/1987 | Graham | 340/624 |
| 4,695,830 | 9/1987 | Graham | 340/677 |

*Primary Examiner*—Glen R. Swann, III
*Assistant Examiner*—Thomas J. Mullen, Jr.
*Attorney, Agent, or Firm*—Mark F. Smith

[57] ABSTRACT

A low cost verbal annunciator which uses a plurality of inexpensive cassette tape players in a central monitoring and control panel is disclosed. Each tape player has an individualized endless cassette tape for playing particular messages over a public address system in response to the occurence of particular monitored conditions. One embodiment for use with a plurality of unique sensors for monitoring a wire manufacturing process is disclosed.

5 Claims, 7 Drawing Sheets

LOW COST VERBAL ANNUNCIATOR

CROSS REFERENCE TO RELATED APPLICATIONS

The invention described herein may employ some of the teachings disclosed and claimed in commonly owned co-pending applications filed on even date herewith by Graham, Ser. No. 788,901, now U.S. Pat. No. 4,635,046, entitled A WIRE TANGLE SENSOR, Ser. No. 788,902, abandoned entitled A WIRE BREAK SENSOR, Ser. No. 788,903, now U.S. Pat. No. 4,695,830, entitled A WIRE RUNTOGETHER SENSOR, and Ser. No. 788,904, now U.S. Pat. No. 4,644,332, entitled A DRY LUBE LEVEL SENSOR. Each of the above listed co-pending applications are hereby expressly incorporated by reference.

TECHNICAL FIELD

This invention relates to process alarm systems and particularly to verbal annunciator systems.

BACKGROUND ART

Modern wire manufacturing processes often require fast response and quick corrective action to prevent production delays. For example, recently developed high speed wire manufacturing processes in which a heavy gage wire is drawn down to a smaller size, e.g., #12 AWG to #22 AWG, can experience faults which, if not rapidly corrected, can cause expensive production shutdowns. Factories for making such wire may consist of a large number of such production units spread over a wide expanse and staffed only by a small number of maintenance personnel on an around the clock basis. Unfortunately, present alarming systems for detecting faults and producing audio and visual alarms are sometimes inadequate in providing sufficient information to immediately direct the maintenance personnel to the source of the problem in time to prevent production shutdowns.

DISCLOSURE OF THE INVENTION

The object of the present invention is to provide a simple and inexpensive verbal annunciator which may include visual alarms and which immediately provides a verbal announcement pinpointing the source of a fault so that immediate corrective action may be taken to prevent undesirable consequences.

According to the present invention, a process alarm system is responsive to a plurality of sensors which provide binary signals indicative of either a normal or abnormal process condition. A central monitoring unit having a plurality of cassette tape players each responsive to one of the binary signals from the plurality of sensors provides individualized verbal message signals in response to the presence of a two-state (binary) signal in a state indicative of an abnormal process condition. A public announcement (PA) system is responsive to the individualized verbal message signals for announcing individualized verbal messages to maintenance personnel.

In further accord with the present invention, such a multichannel central monitoring annunciator may be used in a wire fabrication process, wherein one of the sensors is a tangle sensor for sensing tangled wires fed from a wire basket into a wire drawing machine, wherein the tangle sensor comprises a metallic probe for placement in close proximity to payed out wire from the baskets for touching tangled wires which are payed out from the basket in a tangled manner. Each coil of wire in each basket is grounded and the touching of a tangled wire to a probe provides a ground path for actuating a switch which provides a binary output signal in a state indicative of a tangled wire condition to the central monitoring unit.

In still further accord with the present invention, such an alarm system used in a wire fabrication process may have as one of the sensors a runtogether sensor for sensing enameled wires stuck together in a baking process. A runtogether sensor is made by supporting and balancing a beam along a longitudinal axis thereof. The beam has a plurality of parallel rigid tines extending comb-like outward from therefrom orthogonal to the longitudinal axis. The tines are inserted between a plurality of parallel wires in motion undergoing fabrication. A switch, such as a mercury switch inserted in the beam, a microswitch touching the beam, or a proximity switch near the beam is provided, responsive to movement of the beam about its balance axis induced by a tine forced in motion by a pair of stuck together wires moving past the tine for providing a binary signal in a state indicative of a runtogether condition.

In still further accord with the present invention, in a process alarm system for a wire fabrication process, one of the sensors may be break sensor for sensing a break in a wire. A place for sensing a break is at a "dancer arm" which supports each wire in its passage through the drawing process for the purpose of maintaining tension. Since each wire normally supports the dancer arm about a pivot point, it is a teaching of the present invention to place a source of electromagnetic radiation across a space through which the dancer arm would fall if a wire were to break. A reflector may be attached to the dancer arm for reflecting the radiation in the presence of a broken wire which causes the dancer arm with reflector to fall in the path of the directed radiation. In addition, a radiation detector means, responsive to the reflected radiation provides a binary signal in a state indicative of a broken wire to the central unit.

In still further accord with the present invention, an alarm system for use in a wire fabrication process may include a level sensor for sensing a level of takeup lubricant in an applicator which applies lubricant to enameled wire prior to being wound on spools. Such a level sensor may include a magnet attached to a float within a float tube having a vent at the top, a tubing connector at the bottom and having a magnetic reed switch for insertion in a cavity within an adapter for connecting the float tube to a mounting base. The floating magnet actuates the reed switch according to its proximity thereto.

The alarm system of the present invention is effective in lowering the scrap rate and down time of wire manufacturing processes by providing immediate verbal annunciation of the source of a problem which may be quickly corrected before causing a production shutdown. The use of cassette tape recorders, easily available off-the-shelf at low cost, provides an extremely inexpensive method of providing such a verbal annunciator system as compared to present day digital methods. The costs expended are also less than would be expended in a dedicated single tape multichannel tape recorder type system. The modularity of the cassette player provides a highly desirable means of easy recorder problem correction by simply replacing the cassette player if a problem develops. In addition to the above advantages, the claimed combination of such a verbal annunciator with the inexpensive but highly effective wire fabrication sensors disclosed herein provides a highly effective inexpensive total system approach to avoiding undesirable wire fabrication plant shutdowns at both low equipment and maintenance personnel costs.

These and other objects, features and advantages of the present invention will become more apparent in light of the detailed description of a best mode embodiment thereof, as illustrated in the accompanying drawing.

BEST MODE FOR CARRYING OUT THE INVENTION

Figure 1:
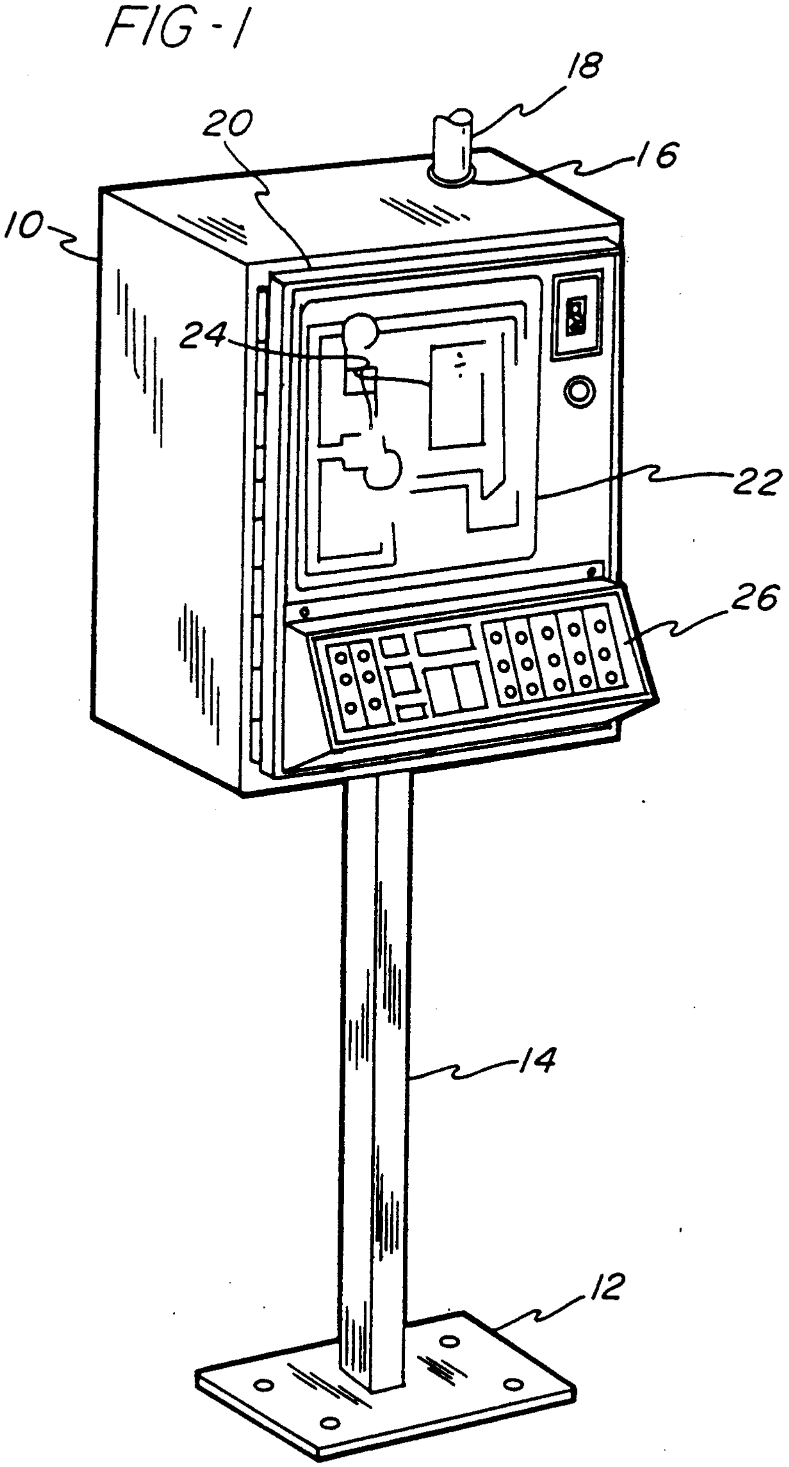
FIG. 1 is an illustration of a central monitoring panel for a process alarm system, according to the present invention.
Figure 3:
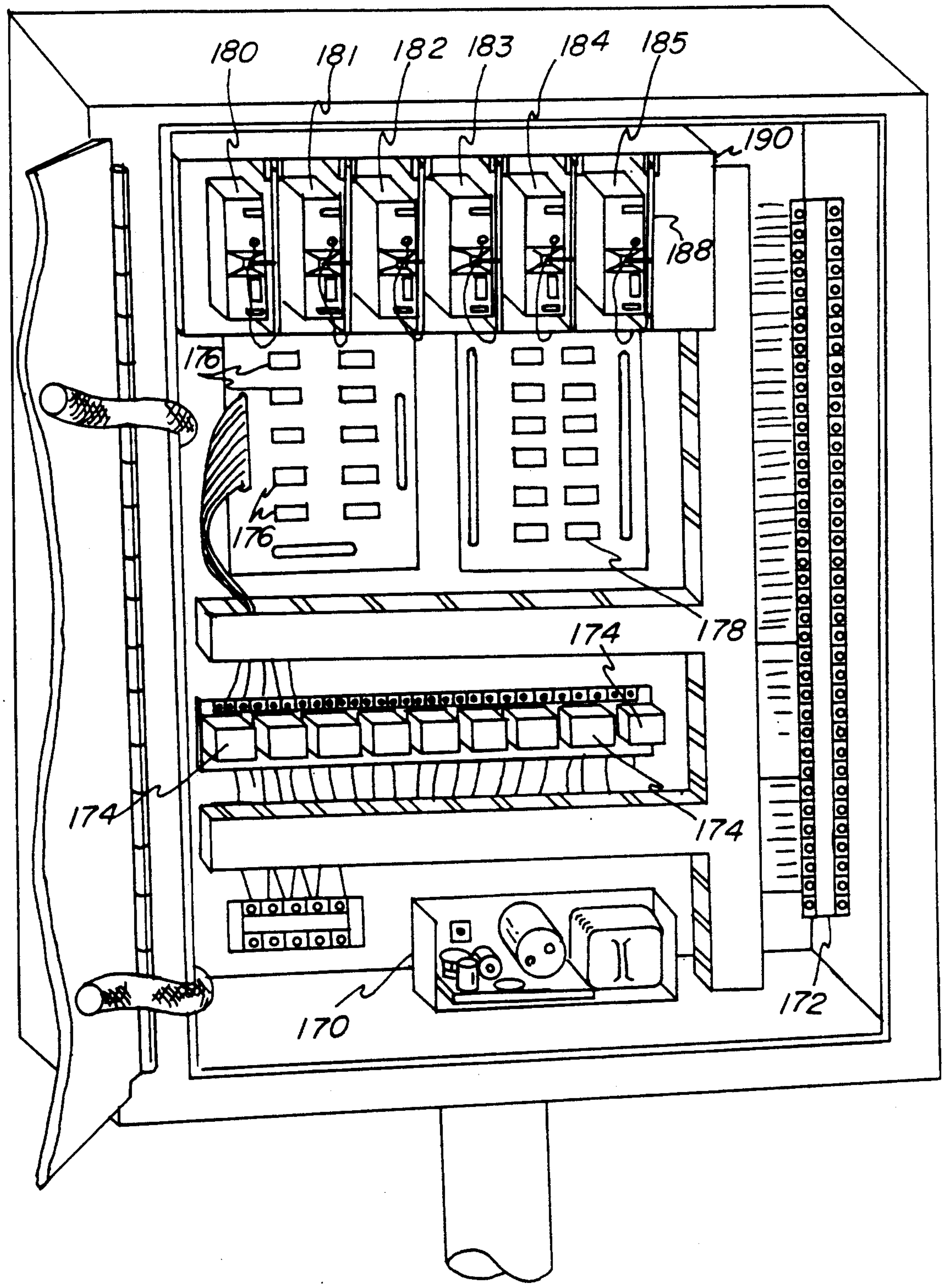
FIG. 3 is an inside view of the central monitoring panel of FIG. 1 and, in particular, showing a plurality of cassette tape players mounted therein.

FIG. 1 is an illustration of a central monitoring and control panel 10, for monitoring the condition of a plurality of remote sensors and for providing a verbal output signal to a power amplifier and speaker for annunciating a verbal alarm message in the presence of a sensed abnormal condition. The panel may be of any convenient construction and need not be of the form shown in FIG. 1. The panel of FIG. 1 includes a pedestal 12 and a post 14 upon which the panel is mounted. A stuffing tube 16 allows a conduit 18 to provide access for external wiring to the sensors and to the power amplifier and speaker. The panel shown in FIG. 1 includes a hinged door 20 which may be opened to reveal the internal components shown in FIG. 3. The front of the door is provided with a plant layout diagram 22 illustrative of the process monitored. A series of illuminated legends 24 are provided on the layout diagram to indicate alarm conditions. A control panel 26 is provided with membrane switches for controlling the alarm system. The construction may be designed, as shown in FIG. 1, to provide good protection against hostile environments. For example, if the annunciator control panel 10 is used in a wire fabrication plant it is likely to be exposed at times to somewhat corrosive fumes which may have an adverse effect on electrical components if not protected. To that end, the membrane switches 26 may be encapsulated in a protective covering and the door may be sealed with a suitable gasket to prevent entry of fumes and liquids from outside into the inside of the panel.

Figure 2:
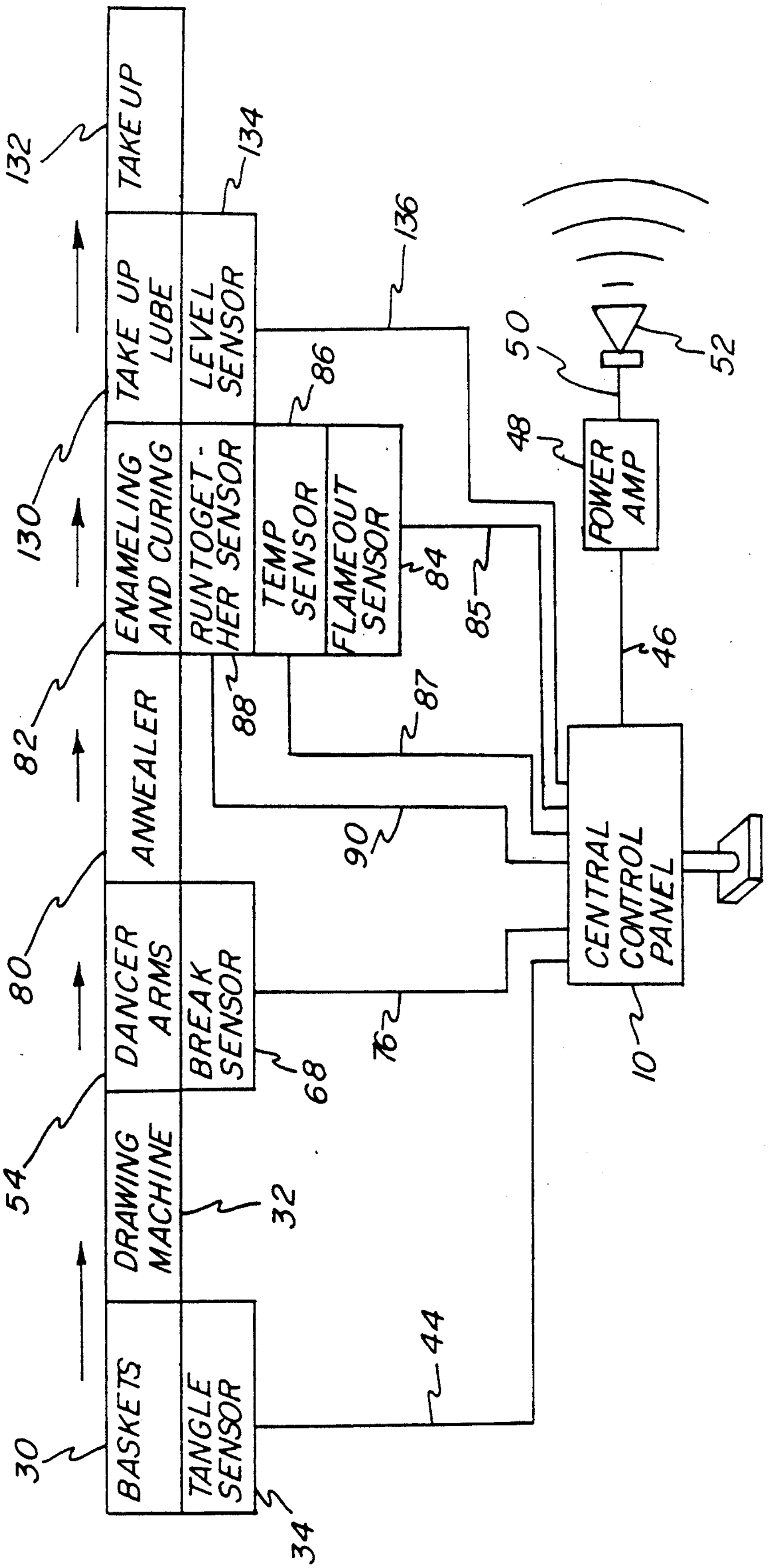
FIG. 2 is a block diagram illustration of a wire fabrication apparatus having sensors which interface with a central monitoring panel for making verbal announcements, according to an embodiment of the present invention.
Figure 7:
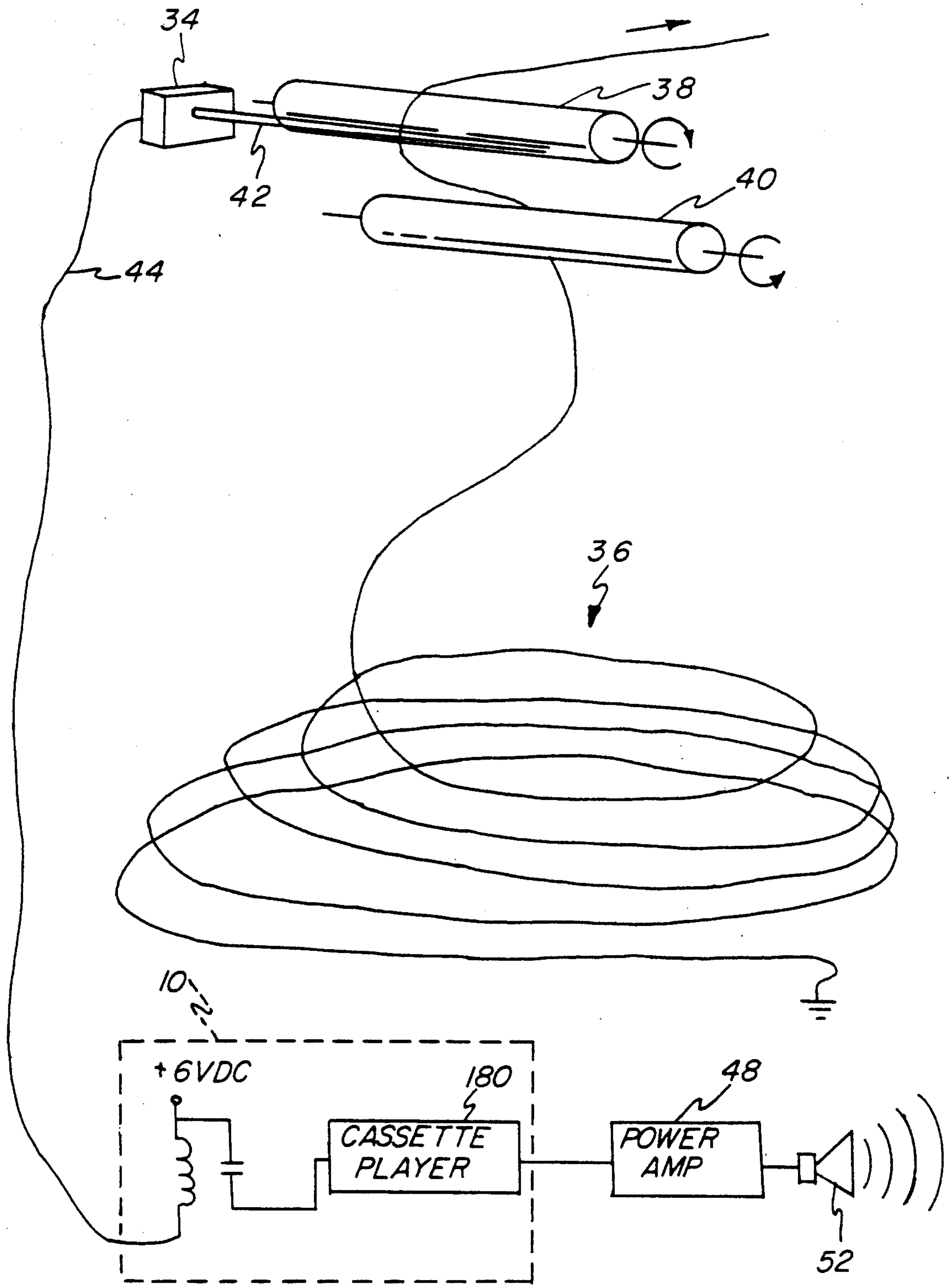
FIG. 7 is a simplified illustration of a coil of wire being drawn up from a wire basket between a pair of rollers having a tangle sensor adjacent thereto.

FIG. 2 is an illustration of the central monitoring and control panel 10 of FIG. 1 installed for use with sensors which monitor a wire fabrication process. In such a process, a plurality of wire baskets 30 provide a relatively heavy gage wire such as #12 AWG wire to a drawing machine 32 which draws the #12 wire down to a smaller size such as #22 AWG. A tangle sensor 34 is used to sense tangled wire about to be fed to the drawing machine 32. This is illustrated in more detail in FIG. 7 where a coil of wire 36 such as would be found in a basket 30 is drawn up between a pair of rollers 38, 40 rotating in the directions shown and which normally receive wire in a straight manner from the basket. Any tangles which develop will be sensed by a metal probe 42 which will at least momentarily touch any tangled wire and thereby complete a circuit to ground (since the coil 36 is grounded).

Referring back to FIG. 2, the tangle signal is provided from the tangle sensor 34 to the central monitoring and control panel 10 on a line 44 and a verbal alarm message signal on a line 46 is provided by the control panel to a power amplifier 48 which increases the power level of the message signal on the line 46 and which provides an increased power level message signal on a line 50 to a speaker 52 which announces the verbal message acoustically within the hearing of maintenance personnel who may then take quick action to correct the problem before a production shutdown occurs.

Figure 9:
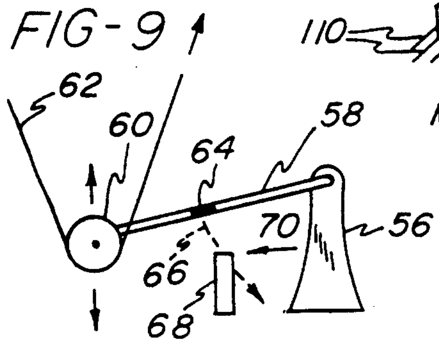
FIG. 9 is an illustration of a dancer arm associated with a break sensor.
Figure 10:
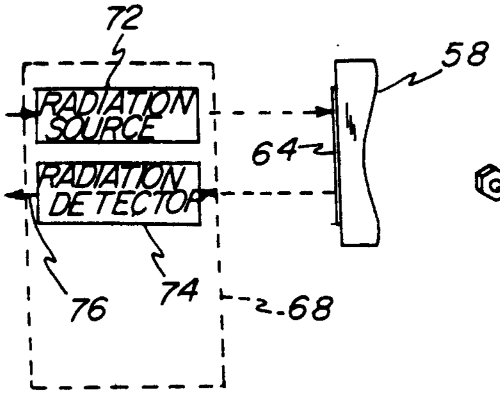
FIG. 10 is an illustration of a radiation source and detector for use with a reflector attached to the dancer arm of FIG. 9.

After the drawn wire exits the drawing machine 32 it is fed to one of a plurality of dancer arms 54 which are used to maintain the correct tension in the exiting wires. A dancer arm is shown in FIG. 9 and includes a pedestal 56, an arm 58, a sheave 60 for engaging a wire 62, and a reflector 64 attached to the arm 58. If the wire 62 breaks, the arm 58 and the attached reflector 64 will fall along a path indicated by a dotted line 66 so that the reflector passes in front of a break sensor 68 shown in more detail in FIG. 10. FIG. 10 is a view along a line 70 in FIG. 9 between the arm 58 and the sensor 68. The arm 58 is partially shown in FIG. 10 having the reflector 64 attached thereto and receiving a directed beam of radiation from a radiation source 72 and reflecting that radiation back to the sensor for detection by a radiation detector 74 which provides a sensed break signal on a line 76 to the central control panel 10 of FIG. 2 which in turn provides an alarm message signal on the line 46 for verbal annunciation through the power amp and speaker to maintenance personnel, as before described in connection with the tangle sensor.

After the wires exit the dancer arms they are subjected to an annealing process in an annealer 80 as shown in FIG. 2. After annealing, an enameling and curing process is effected in an enameler and curing oven 82. There are a number of conditions which may be sensed within the oven including flameout, temperature, and runtogether. A flameout sensor, which may be of the UV type, provides a flameout signal on a line 85 to the central monitoring and control panel for verbal annunciation on the speaker 52, as before. Similarly, a temperature sensor may sense over-temperature, or under-temperature, or both, and provides an abnormal temperature signal on a line 87 to the central control panel for annunciation on the speaker 52. Similarly, a runtogether sensor 88 is provided for sensing wires which may have been inadvertently baked together in the curing oven 82. A runtogether signal on a line 90 is provided to the central monitoring and control panel 10 for annunciation on the speaker 52.

Figure 8:
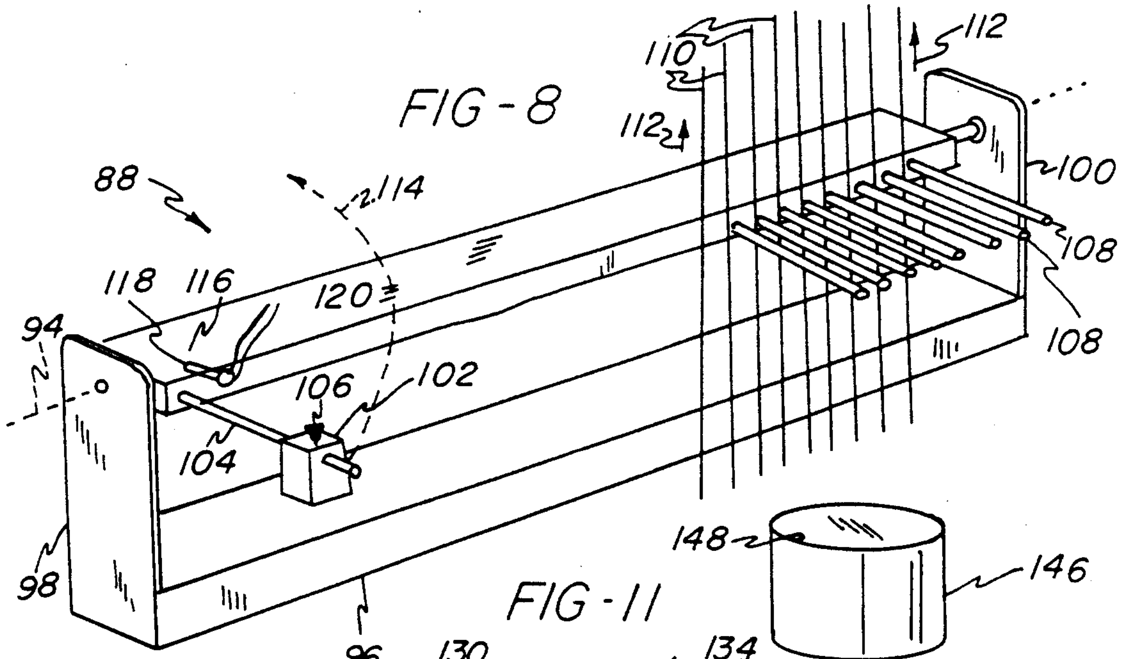
FIG. 8 is a simplified illustration of a runtogether sensor

FIG. 8 is a more detailed illustration of a runtogether sensor 88 and includes a balance beam 92 balanced along a longitudinal axis 94 thereof on a bracket 96 which includes two opposing support members 98, 100. The balance beam 92 is balanced by means of a balance weight 102 extending outwards from the balance beam along a tine 104. A set screw 106 permits the proper positioning of the balance weight to effect the desired balance condition.

A plurality of rigid tines 108, only a few of which are shown in FIG. 8 extend outwardly from an edge of the balance beam 92 orthogonal to the balance axis 94. The tines are intended for insertion between a plurality of moving wires 110 undergoing the fabrication process of FIG. 2. The wires being fabricated are in motion in a direction indicated by arrow 112 in FIG. 8. If any two or more wires become bonded together in the enameling and curing oven 82 they will "catch" on one of the tines 108 and the balance beam will be forced to pivot about its axis as shown by a dotted line 114 until the bonded wires pass by and the "caught" tine is freed.

A cavity 116 in the balance beam is used to retain a mercury switch 118 having a pair of output leads 120 for providing the signal on line 90 of FIG. 2. Of course, it will be understood that a proximity sensor or the like would do as well although probably at higher expense.

Referring back to FIG. 2, after several enameling and curing steps accomplished in the oven 82, the finished wires are lubricated in a takeup dry lube applicator 130. It is important to measure the level of lubricant in the applicator in order to assure proper lubrication on a plurality takeup spools 132. Therefore, it is essential to provide a reliable level sensor 134 for providing an out-of-lubricant or low level lubricant signal on a line 136 to the central monitoring and control panel 10 for verbal annunciation, as before.

Figure 11:
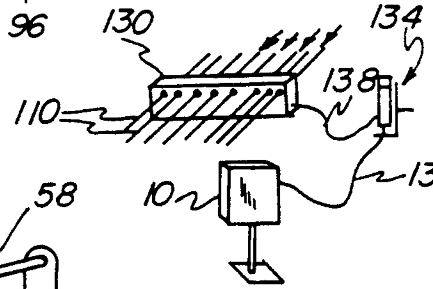
FIG. 11 is an illustration of the level sensor of FIG. 12 in use with a takeup lubrication applicator and the central alarm of FIG. 1.

FIG. 11 is an illustration of an applicator 130 receiving a plurality of fabricated wires 110 along the direction indicated for lubrication prior to spooling on the takeup spools 132 of FIG. 2. A sensing tube 138 connects the applicator to the level sensor 134. If the level drops below a selected level the abnormal level signal on the line 136 is provided to the central monitoring and control panel 10, as shown in FIG. 11.

Figure 12:
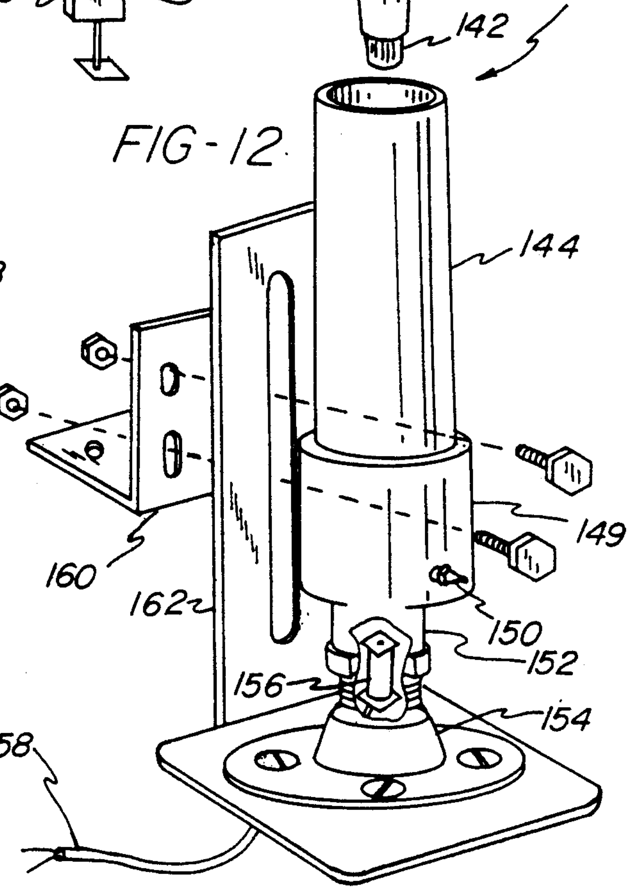
FIG. 12 is an illustration of a takeup lube float switch.

FIG. 12 is a more detailed illustration of the level sensor 134 of FIGS. 2 and 11. A small polypropylene bottle 140, such as the type used by secretaries to correct typing errors, is attached to a magnet 142 by means of shrink tubing, or some other means. The bottle and magnet float is inserted into a cylindrical body 144 which may be PVC thin wall tubing of a diameter suitable for permitting the bottle 140 to float freely. A cap 146, such as PVC, having a vent hole 148 is attached to the top of the main cylindrical body and is removable for permitting cleaning and to inspect the float. A bottom cap 149 to seal the bottom of the main tube 144 is provided with a brass tubing connector 150 for hookup to the sensing tube 138 of FIG. 11. A threaded pipe adapter 152 is attached to the bottom cap 149 for connection to a pipe flange 154 used as a mounting base for the float switch. A small reed switch 156 is inserted and sealed inside the adapter and installed at the bottom edge of the cap 149 for maximum sensitivity. A pair of leads 158 emerge from the bottom of the flange and are used to provide the abnormal level signal on the line 136 of FIGS. 11 and 2. A mounting bracket assembly 160, 162 may be provided to provide adjustability of the operating level inside the switch.

When tubed to the dry lube applicator and vented to atmosphere the level inside the float switch will match that of the applicator if the two are capable of being in the same plane. By using the sliding bracket one may adjust the point at which the switch will trigger by moving the switch up or down from a point of reference. It will of course be understood that the float switch shown in FIG. 12 may also be used for purposes other than mere alarm sensing such as for control purposes. The float switch is particularly useful for monitoring the level of a lubricant such as Lacolene TM and beeswax which tends to clog other devices.

Referring back to FIG. 3, a view of the inside of the central monitoring and control panel 10 of FIG. 1 there illustrated. In particular, in addition to a power supply 170, a terminal board 172, a plurality of power relays 174, low-power relays 176, 178, there is illustrated a plurality of cassette players 180–185 which are mounted individually on plates, e.g., as shown by plate 188 in a rack 190.

Figure 4:
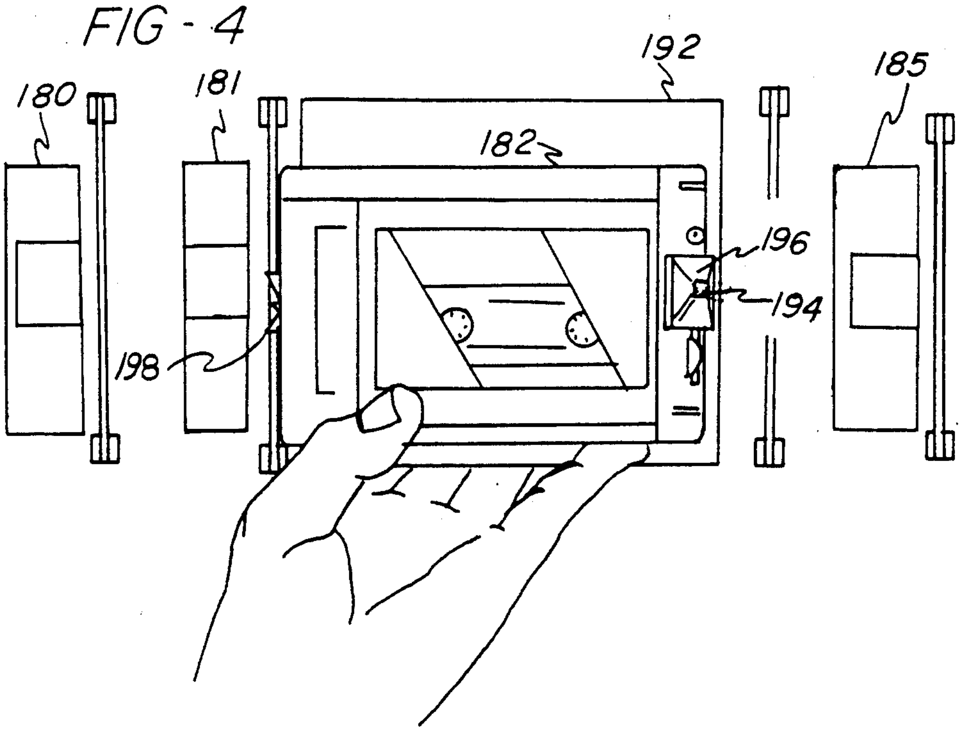
FIG. 4 is an illustration of a cassette tape player mounted on a plate and removed by hand from its installation as shown in FIG. 3.

FIG. 4 shows a cassette player 182 and a plate 192 removed from the rack 190 for inspection. The cassette player 182 is attached to the plate by means of a tie-wrap 194 attached at each end of the cassette player by anchors 196, 198. The tie-wrap is used to tightly bind the cassette player to the plate by wrapping the tie-wrap behind the plate 192 of FIG. 4.

Figure 5:
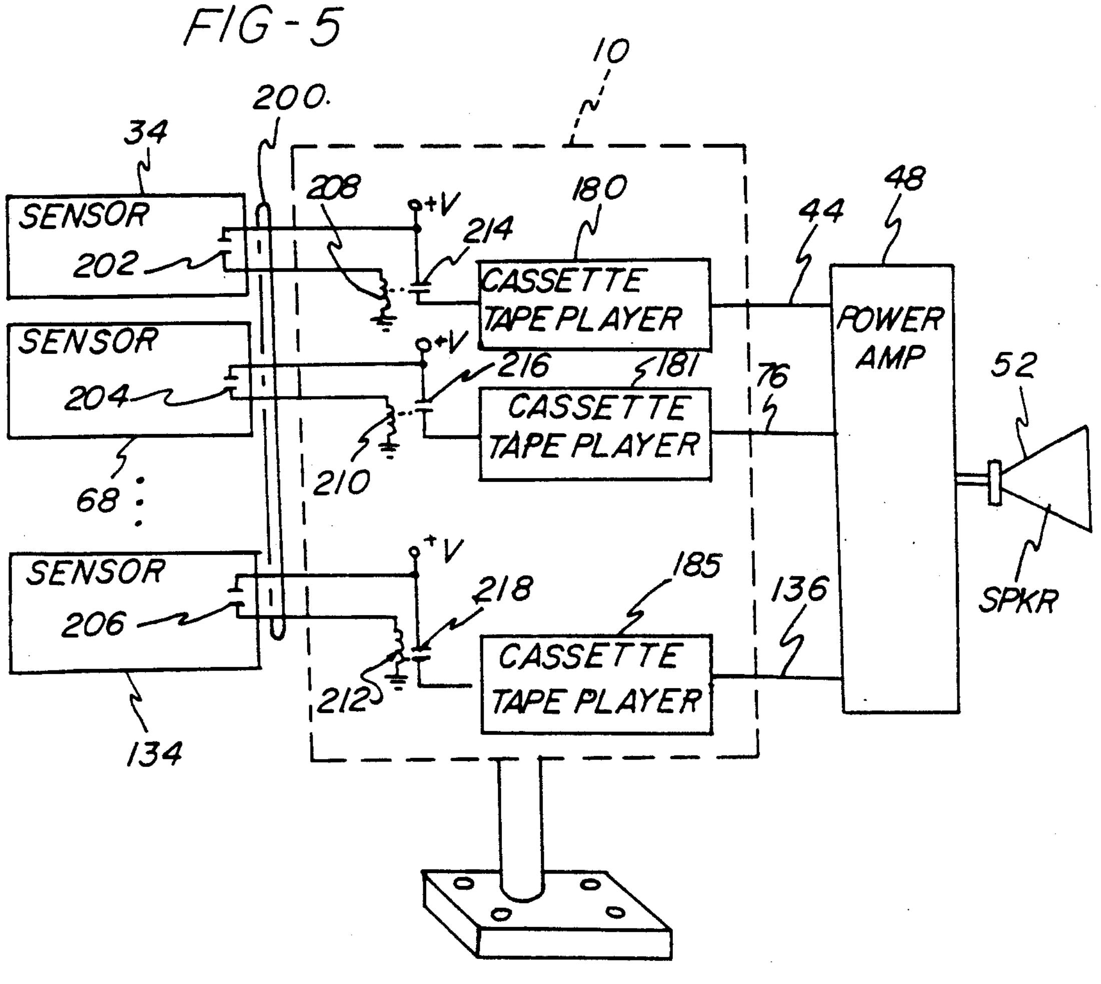
FIG. 5 is a simplified schematic block diagram illustration of a verbal alarm announcement system, according to the present invention.

A simplified schematic block diagram illustration of the manner in which the cassette tape players 180–185 are connected in the central monitoring and control panel 10 is shown in FIG. 5. There, a plurality of sensors, such as is illustrated in FIG. 2, provide signals on a plurality of lines 200 to the control panel 10. Each sensor may be conceptually illustrated as providing a contact (202, 204, . . . 206) closure for abnormal conditions. Such a contact closure will provide voltage to respective relay coils 208, 210, . . . 212 which act to close associated contacts 214, 216, . . . 218 to effect energization of the cassette tape players, as appropriate. Of course, it will be understood that the illustration of FIG. 5 is merely presented in simplified form for illustrative purposes and the conceptualized switches and relay coils, etc., are illustrative only and may be replaced with other types of switches, contacts, etc., such as transistor switches, digital logic, etc. Each of the cassette tape players 180, 181, . . . 185, when appropriate, will provide abnormal message signals on lines 44, 76, . . . 136 to the power amplifier 48 and speaker 52 of FIG. 2.

Figure 6:
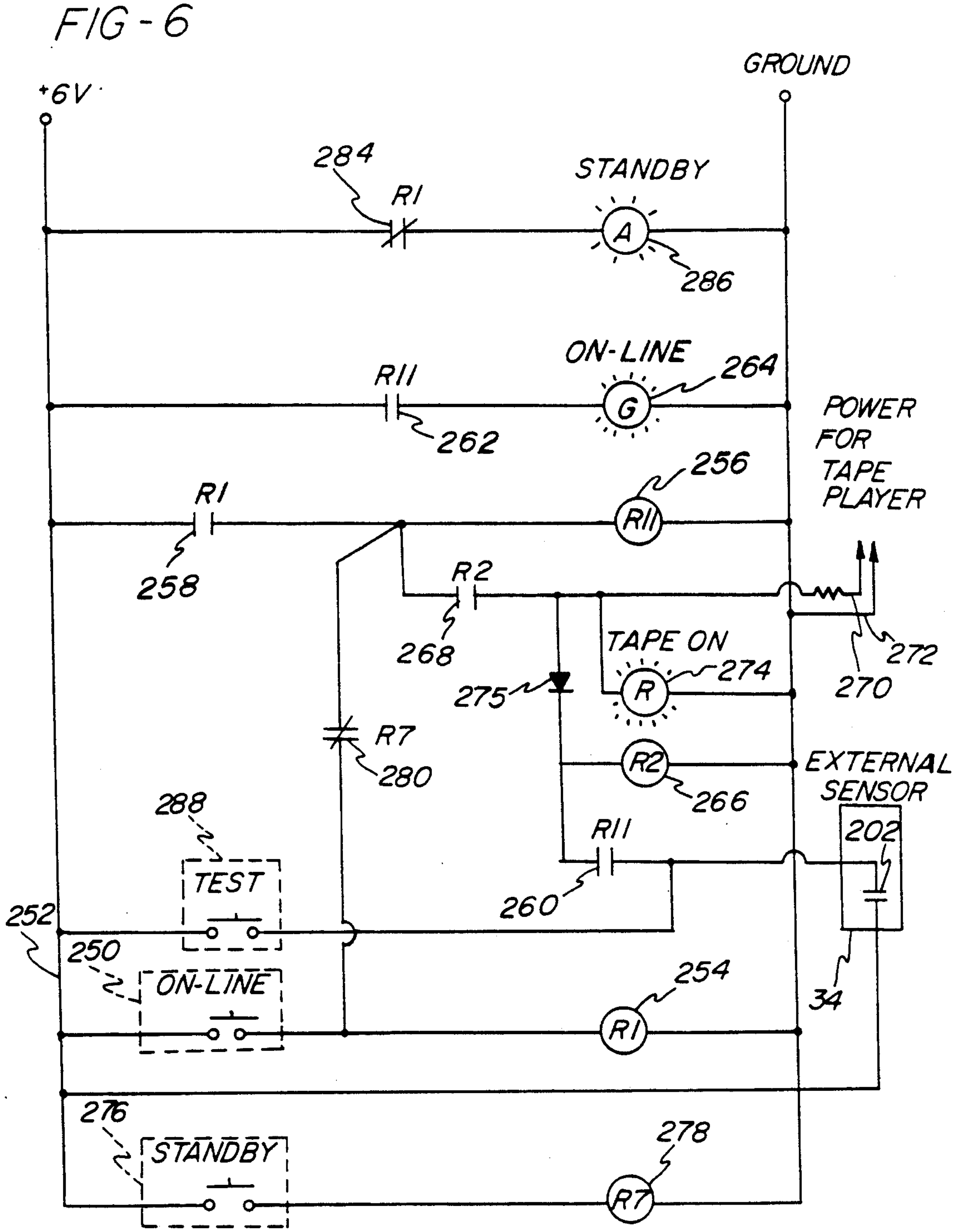
FIG. 6 is a simplified schematic diagram showing one way in which a verbal alarm announcement channel may be designed.

FIG. 6 is a typical control circuit for a control panel such as the central monitoring and control panel 10 of FIG. 1 for controlling the power to a cassette tape player. For example, an external sensor 34, such as the tangle sensor of FIG. 2, provides a contact closure to the control circuit for actuating the tape player by means of providing power to the drive motor in the player.

The operation of the circuit of FIG. 6 can be described briefly as follows An ON-LINE switch 250 may be actuated to provide 6 VDC on a line 252 to energize a pair of relay coils 254, 256. The energization of coil 254 causes normally opened contact 258 to close which maintains coils 254 and 256 in the energized state after switch 250 is released. The energization of coil 256 causes normally opened contacts 260, 262 to close. A green on-line lamp is thereby energized and a path for energizing a coil 266 is partially made. If the external sensor 30 is subsequently made as well, then the path is completely made, coil 266 will be energized, a normally opened contact 268 will close and power for the tape player will be supplied to the tape player's drive motor on a pair of lines 270, 272. A red TAPE-ON lamp 274 is also energized by the closing of contact 268. The tape player will then begin to provide an alarm message output signal to the power amplifier 48 and speaker 52 of FIG. 5. A diode 275 permits the message to continue even if the sensor switch 202 reopens. Maintenance personnel will then respond to the verbal announcement and may silence the verbal message by actuating a STANDBY switch 276 which causes a relay coil 278 to become energized which in turn causes a normally closed contact 280 to open thereby deenergizing coil 254 and opening contact 258. This causes coil 256 to become deenergized and contact 260 to open thereby deenergizing coil 266 and opening contact 268 which removes power from the tape player and causes the red light 274 to go out. A normally closed contact 284 will then close and an amber STANDBY lamp 286 will then go on to indicate on the panel 10 that the channel is in a standby or silence condition undergoing maintenance.

If, during normal ON-LINE operation, an operator wishes to test the verbal annunciator for this particular channel he may actuate a test switch 288 which acts in substitution for the external sensor 34 to energize coil 266 which causes power to be applied to the tape player through contact 268 for as long as the test switch is pressed in.

Of course, the circuit of FIG. 6 is replicated for each channel shown in FIG. 5. I. e., the channel illustrated in FIG. 6 corresponds to the channel associated with sensor 34 and cassette play 180 of FIG. 5. Each of the other channels of FIG. 5 will have a similar circuit for accomplishing the same purpose. It will also be understood that the illustration of FIG. 6 is still in somewhat simplified form in that additional circuitry may be added to increase the sophistication of the circuit to provide, e.g., interlocks and other elaborations.

It should also be understood that the low cost process alarm system disclosed and claimed herein is not necessarily restricted for use in a wire fabrication process. It is generally applicable to any process including the monitoring of fire alarm zones, chemical plant operations, manufacturing facilities of all kinds, and a wide variety of other applications. Thus, although the invention has been shown and described with respect to illustrated embodiments thereof, it should be understood by those skilled in the art that the foregoing and various other changes, omissions, and additions in the form and detail thereof may be made therein without departing from the spirit and scope of the invention.

I claim:

1. An alarm channel for a multichannel verbal annunciator having amplifier and speaker means responsive to verbal message signals for announcing verbal messages, the alarm channel responsive to an external sensor (34), having a contact (202) responsive to a voltage (252) for providing the voltage to the alarm channel in response to a sensed condition, the alarm channel comprising:

a normally open momentary close switch (250), responsive to the voltage (252) for momentarily closing in response to external actuation thereby momentarily providing the voltage to a first relay (254), responsive to said momentary voltage provided by said momentary contact switch for closing an associated contact (258) also responsive to the voltage (252), for providing the voltage to said first relay (254) for keeping said first relay energized after said momentary switch is re-opened after external actuation and for providing the voltage to a second relay (256), responsive to the voltage provided by said first relay contact (258) for closing an associated contact (260) responsive to the voltage provided by the external sensor for providing the voltage to a third relay (266), responsive to the voltage provided by said second relay contact (260) for closing an associated contact (268) responsive to the voltage provided by the first relay contact (258) for providing the voltage to a cassette tape player for providing a verbal message signal to the amplifier and speaker in response to the voltage provided by the third relay contact (268).

2. The alarm channel of claim 1, further comprising:

a second contact (262) associated with said second relay (256), responsive to the voltage (252) for providing the voltage to a lamp (264) for providing an indication of channel energization in response to the voltage.

3. The alarm channel of claim 1, further comprising:

a lamp (274) responsive to the voltage provided by the third relay contact (268) for indicating that said cassette tape player is providing a verbal message signal.

4. The alarm channel of claim 1, further comprising:

a second normally open momentary close switch (276), responsive to the voltage (252) for momentarily closing in response to external actuation thereby momentarily providing the voltage to a fourth relay (278), responsive to said momentary voltage provided by said momentary contact switch (276) for opening an associated contact (280) responsive to the voltage provided by the first relay contact (258) for interrupting the voltage provided to said first relay (254) thereby interrupting said keeping energized said first relay.

5. The alarm channel of claim 4, further comprising:

a normally closed contact (284) associated with said first relay (254), responsive to the voltage for providing the voltage when said first relay is not energized by the voltage; and a lamp (286) responsive to the voltage provided by said normally closed contact (284) for indicating a standby condition after said second momentary switch (276) is actuated and before said momentary switch (250) is actuated.

6. The alarm channel of claim 1, further comprising:

a diode (275), responsive to the voltage provided by the third relay contact (268) for providing that voltage to said third relay in order to keep said third relay energized even if the external sensor contact (202) should reopen after closing.

7. The alarm channel of claim 1, further comprising:

a third normally open momentary close switch (288), responsive to the voltage (252) for momentarily closing in response to external actuating thereby momentarily providing the voltage to said second relay contact (260) for providing the voltage to said third relay (266) for simulating an external sensor contact closure.

* * * * *